(12) United States Patent
Gota et al.

(10) Patent No.: US 7,981,956 B2
(45) Date of Patent: Jul. 19, 2011

(54) EMULSION COMPOSITION

(75) Inventors: Tetsuya Gota, Tokyo (JP); Koji Beppu, Tokyo (JP)

(73) Assignee: Adeka Corporation, Tokyo (JP)

( * ) Notice: Subject to any disclaimer, the term of this patent is extended or adjusted under 35 U.S.C. 154(b) by 1056 days.

(21) Appl. No.: 11/350,794

(22) Filed: Feb. 10, 2006

(65) Prior Publication Data

US 2006/0189734 A1    Aug. 24, 2006

(30) Foreign Application Priority Data

Feb. 21, 2005  (JP) ................................. 2005-044462
Jan. 12, 2006  (JP) ................................. 2006-005243

(51) Int. Cl.
*C08K 5/05*    (2006.01)
*B05D 5/10*    (2006.01)

(52) U.S. Cl. ..................... 524/379; 427/358; 427/385.5; 427/407.1

(58) Field of Classification Search .................. 524/379; 427/358, 385.5, 407
See application file for complete search history.

(56) References Cited

U.S. PATENT DOCUMENTS 5,814,313 A * 9/1998 Slavtcheff et al. .......... 424/78.03
2004/0077774 A1 * 4/2004 Ahrens et al. ................ 524/556

FOREIGN PATENT DOCUMENTS

| JP | 53101540 | * | 9/1978 |
| JP | 11-279454 | | 10/1999 |
| JP | 2001-354847 | | 12/2001 |
| JP | 2003-226892 | | 8/2003 |
| JP | 2004-098054 | | 4/2004 |
| JP | 2005-154556 A | * | 6/2005 |

OTHER PUBLICATIONS

Database WPI, Section Ch, Week 199517, Derwent Publications Ltd., London, GB; AN 1995-126312, XP002387769 & JP 07 048582 A (Kao Corp.), Feb. 21, 1995.
Database WPI, Section Ch, Week 199305, Derwent Publications Ltd., London, GB; AN 1993-039434, XP002387770 & JP 04 363391 A (Neos KK), Dec. 16, 1992.
English Translation of JP 53101540A (Akimoto) published Sep. 5, 1978.

* cited by examiner

*Primary Examiner* — Robert D. Harlan
(74) *Attorney, Agent, or Firm* — Wenderoth, Lind & Ponack, L.L.P.

(57) ABSTRACT

An emulsion composition according to the present invention includes: a nonionic compound having a molecular weight that is greater than or equal to 500 and a cloud point that is less than or equal to 80 degrees Celsius in a 1 percent aqueous solution in which ethylene oxide and an alkylene oxide having a carbon number that is greater than or equal to 3 are added in block and/or random form to an aliphatic alcohol having a carbon number that is less than or equal to 18; and a synthetic resin.

15 Claims, No Drawings

EMULSION COMPOSITION

BACKGROUND OF THE INVENTION

1. Field of the Invention

The present invention relates to an emulsion composition that can be made to dry uniformly when applied, or a paint composition in which such an emulsion composition is used, and more specifically, relates to an emulsion composition that can be made to dry uniformly without giving rise to cracking or blistering, etc., when paint having a thick film thickness such as a damping material paint is being dried or is dried at a high temperature, and in addition, can prevent dripping when applied to vertical surfaces or irregular surfaces, etc., even if dried at high temperatures, or to a water-base paint composition in which such an emulsion composition is used.

2. Description of the Related Art

Water-base emulsion compositions have water as a medium, and are used widely in adhesives, paints, etc., since they are safe from the viewpoint of flammability and toxicity. When emulsion compositions dry to form a continuous coating, moisture inside the emulsion volatilizes and water-insoluble emulsion particles bond with each other to form the coating, and plasticizers or high boiling solvents such as butyl cellosolve, etc., may be used as film forming auxiliaries to assist such coating formation. However, one problem has been that film forming auxiliaries have no effect if the paint film is thick or if drying temperatures are high, etc., and cracking or blistering, etc., of the paint film may occur. Such problems of cracking and blistering of the paint film are more likely to occur when the paint film is thick or is dried by applying temperature forcibly, etc., but they are problems that may occur at any time due to other factors such as changes in drying temperature, types of emulsion, etc., even if the paint film is thin and is dried at normal temperatures. Another problem has been that such aqueous emulsion compositions drip if dried at high temperatures when applied to vertical surfaces or irregular surfaces, etc.

Methods are known in which inorganic fillers such as activated carbon, calcium carbonate, etc., are added in order to prevent such problems and prevent cracking and blistering of the emulsion composition during film formation. In Japanese Patent Laid-Open No. HEI 10-324822, for example, a damping water-base paint composition is disclosed (Claim 1) that is a damping water-base paint composition including a resin emulsion and a filler as essential components, the resin emulsion being a resin emulsion in which: Tg is 10 to 50 degrees Celsius; a loss angle tangent (tangent delta) is greater than or equal to 1.5; and a mean particle diameter of a resin particle is 150 to 1,000 nm, the filler including 1 to 45 percent by weight (percent by mass) activated carbon. In paragraph [0020] of that patent laid-open, there is also a description to the effect that "fillers other than activated carbon include, for example: calcium carbonate, magnesium carbonate, barium sulfate, aluminium hydroxide, alumina, aluminium sulfate, calcium silicate, talc, clay, silica, carbon black, titanium oxide, mica, sepiolite, etc."

Adding fibers such as natural fibers, synthetic fibers, etc., to an emulsion composition is also known. In Japanese Patent Laid-Open No. HEI 5-331390, for example, a paint composition is disclosed (Claim 1) into which is combined one species or more from: natural fibers; regenerated fibers; semi-synthetic fibers; or synthetic fibers.

In addition, paints containing a thermosensitive gelatinizer constituted by a siloxane-polyoxyalkylene copolymer, and an ion cross-linking agent constituted by zinc oxide are known. In Japanese Patent Laid-Open No. HEI 6-157938, for example, a chipping resistant baked paint is disclosed (Claim 1) that has as essential components: a synthetic rubber latex and/or synthetic resin emulsion (A); a filler (B); a thermosensitive gelatinizer (C) constituted by a siloxane-polyoxyalkylene copolymer; and an ion cross-linking agent (D) constituted by zinc oxide.

Methods are also known in which thixotropic thickeners such as xanthan gum, or hydroxyethylcellulose, etc., are added in order to prevent dripping problems. In Japanese Patent Laid-Open No. 2000-34429, for example, a paint (Claim 1) is disclosed that contains high-viscosity xanthan gum that displays a viscosity of 3,500 to 25,000 mPa·s (B-type viscometer at 6 rpm, 25 degrees Celsius) in an aqueous solution having a xanthan gum concentration of 0.5 percent by weight (percent by mass).

Emulsions such as the damping water-base paint composition disclosed in Japanese Patent Laid-Open No. HEI 10-324822, in which inorganic compounds such as those described above are added as inorganic fillers, can be painted in a thick paint film, and blistering of the paint film can be suppressed to a certain extent during paint film drying, but such effects are insufficient, and in addition, one problem has been that they have almost no effect on cracking of the paint film. The paint composition described in Japanese Patent Laid-Open No. HEI 5-331390 also could not be said to have a sufficient effect on blistering and cracking during paint film drying. In addition, the chipping resistant baked paint described in Japanese Patent Laid-Open No. HEI 6-157938 could not be said to have a sufficient effect on blistering and cracking of the paint film, and in addition, other problems have been that in some cases effects do not appear at all due to the combination in the paint (the presence of ionic compounds such as salts, etc.) since ionic compounds are used, and the burden on the environment is increased during disposal since metal compounds are used. Furthermore, another problem has been that dripping cannot be prevented in the paint described in Japanese Patent Laid-Open No. 2000-34429 when dried at high temperatures since the viscosity decreases rapidly.

SUMMARY OF THE INVENTION

Consequently, an object of the present invention is to provide an emulsion composition eliminating blistering, cracking, dripping, etc., of a paint film during drying, and more specifically, to provide an emulsion composition or water-base paint composition that can be made to dry uniformly without giving rise to cracking or blistering, etc., when paint having a thick film thickness such as a damping material paint is being dried or is dried at high temperatures, and in addition, can prevent dripping when applied to a vertical surface or an irregular surface, etc., even if dried at high temperatures.

Thus, the present inventors have diligently investigated and have completed the present invention by finding that an emulsion composition that contains a polyalkylene glycol compound that has a specific structure and a synthetic resin can eliminate blistering and cracking of a paint film even if thickness of the paint film is increased or drying temperatures are raised, and in addition can prevent dripping when applied to vertical surfaces or irregular surfaces, etc., even if dried at high temperatures.

Specifically, an emulsion composition according to the present invention includes: a nonionic compound having a molecular weight that is greater than or equal to 500 and a cloud point that is less than or equal to 80 degrees Celsius in a 1 percent aqueous solution in which ethylene oxide and an alkylene oxide having a carbon number that is greater than or equal to 3 are added in block and/or random form to an aliphatic alcohol having a carbon number that is less than or equal to 18; and a synthetic resin.

DESCRIPTION OF THE PREFERRED EMBODIMENTS

Aliphatic alcohols having a carbon number that is less than or equal to 18 that can be used for a nonionic compound employed in an emulsion composition according to the present invention are straight-chain or branched-chain saturated or unsaturated aliphatic, alicyclic, etc., alcohols having no aromatic rings, or such alcohols that have been dehydrated and condensed, and are not particularly limited provided that the total carbon number is less than or equal to 18.

Among alcohols of this kind, examples of monohydric alcohols include, for example: methanol; ethanol; propanol; isopropanol; butanol; isobutanol; secondary butanol; tertiary butanol; pentanol; isopentanol; secondary pentanol; neopentanol; tertiary pentanol; hexanol; secondary hexanol; heptanol; secondary heptanol; octanol; 2-ethylhexanol; secondary octanol; nonanol; secondary nonanol; decanol; secondary decanol; undecanol; secondary undecanol; dodecanol; secondary dodecanol; tridecanol; isotridecanol; secondary tridecanol; tetradecanol; secondary tetradecanol; hexadecanol; secondary hexadecanol; stearyl alcohol; isostearyl alcohol; oleyl alcohol, etc.

Examples of dihydric alcohols include, for example: ethylene glycol; propylene glycol; 1,2-butanediol; 1,3-butanediol; 1,4-butanediol; 1,5-pentanediol; neopentyl glycol; isoprene glycol (3-methyl-1,3-butanediol); 1,2-hexanediol; 1,6-hexanediol; 3-methyl-1,5-pentanediol; 1,2-octanediol; octanediol (2-ethyl-1,3-hexanediol); 2-butyl-2-ethyl-1,3-propanediol; 2,5-dimethyl-2,5-hexanediol; 1,2-decanediol; 1,2-dodecanediol; 1,2-tetradecanediol; 1,2-hexadecanediol; 1,2-octadecanediol; 1,12-octadecanediol; 1,2-cyclohexanediol; 1,4-cyclohexanediol; 1,4-cyclohexanedimethanol, etc.

In addition, examples of trihydric alcohols include, for example: glycerin; 1,2,3-butanetriol; 1,2,4-butanetriol; 2-methyl-1,2,3-propanetriol; 1,2,3-pentanetriol; 1,2,4-pentanetriol; 1,3,5-pentanetriol; 2,3,4-pentanetriol; 2-methyl-2,3,4-butanetriol; trimethylolethane; 2,3,4-hexanetriol; 2-ethyl-1,2,3-butanetriol; trimethylolpropane; 4-propyl-3,4,5-heptanetriol; pentamethylglycerine (2,4-dimethyl-2,3,4-pentanetriol), etc.

Examples of tetrahydric alcohols include, for example: pentaerythritol; 1,2,3,4-pentanetetrol, 2,3,4,5-hexanetetrol; 1,2,4,5-pentanetetrol; 1,3,4,5-hexanetetrol; diglycerin; ditrimethylolpropane; sorbitane, etc.

In addition, examples of pentahydric alcohols include, for example: adonitol; arabitol; xylitol; triglycerin, etc., and examples of hexahydric alcohols include, for example: dipentaerythritol; sorbitol; mannitol; iditol; inositol; dulcitol; talose; allose, etc. Examples of alcohols having a hydricity that is greater than or equal to 7 include polyglycerins; disaccharides; oligosaccharides, etc., having a degree of polymerization that is greater than or equal to 5.

These alcohols may also be used as mixtures of alcohols having equal hydricity, or may also be used as mixtures of alcohols having differing hydricity, but it is preferable that the alcohols used have a hydricity that is 2 to 6 because the suppression of blistering and cracking during drying is increased, and because viscosity may also increase if an alkylene oxide is added to an alcohol having a hydricity that is greater than or equal to 7, making handling difficult, etc. Furthermore, the alcohols should preferably have a carbon number that is 1 to 12, more preferably 1 to 8, even more preferably 3 to 6, and propylene glycol, dipropylene glycol, glycerin, trimethylolpropane, pentaerythritol, and sorbitol are most preferable. It is undesirable for the carbon number to exceed 18 since solubility of the corresponding nonionic compound into the emulsion composition becomes poor and separation may occur.

The nonionic compound used in the emulsion composition according to the present invention is a compound that is formed by adding alkylene oxides to the above alcohols. The added alkylene oxides must be a combination of two or more species of alkylene oxide including ethylene oxide, and the alkylene oxide combined with the ethylene oxide is an alkylene oxide having a carbon number that is greater than or equal to 3, and includes, for example: propylene oxide; butylene oxide; tetrahydrofuran, etc. Among these, propylene oxide and butylene oxide are preferable. The form of the added alkylene oxides may be any form such as block copolymers, random copolymers, random/block copolymers, etc., but random copolymers are preferable because the suppression of blistering and cracking is increased.

The nonionic compound used in the emulsion composition according to the present invention must have a molecular weight that is greater than or equal to 500, preferably 500 to 50,000, and more preferably 500 to 30,000. It is undesirable for the molecular weight to be less than 500 since blistering, cracking, etc, of the paint film cannot be suppressed effectively. Moreover, in order to make the molecular weight of the nonionic compound greater than or equal to 500, the molecular weight may be adjusted by the amount of added alkylene oxides added.

Any commonly-known method can be used as a method for adding the alkylene oxides. The most common method, for example, is a method reacting at 50 to 180 degrees Celsius at a pressure of 0.03 MPa to 1 MPa in the presence of a catalyst, but a reaction temperature of 70 to 160 degrees Celsius is preferable, and 80 to 150 degrees Celsius is even more preferable. If the reaction temperature is less than or equal to 50 degrees Celsius, reactions may not terminate since reaction rates become slow, and it is undesirable for the reaction temperature to exceed 180 degrees Celsius, since problems such as coloring, etc., may arise. If the pressure is lower than 0.03 MPa, the quantity of alkylene oxides that can be placed inside a reaction apparatus may be excessively reduced, increasing reaction time, and it is undesirable for the pressure to exceed 1 MPa, since the quantity of the alkylene oxides inside the reaction apparatus may be increased, making it difficult to control the reaction.

Moreover, examples of catalysts that can be used in the addition reaction include, for example: strong acids such as sulfuric acid, toluenesulfonic acid, etc.; metal halides such as titanium tetrachloride, hafnium chloride, zirconium chloride, aluminum chloride, gallium chloride, indium chloride, iron chloride, tin chloride, boron fluoride, etc.; hydroxides, alcoholate compounds, or carbonates of alkali metals or alkaline-earth metals such as sodium hydroxide, potassium hydroxide, sodium methylate, sodium carbonate, etc.; metal oxides such as aluminum oxide, calcium oxide, barium oxide, sodium monoxide, etc.; and organometallic compounds such as tetraisopropyltitanate, dibutyl tin dichloride, dibutyl tin oxide, etc., but hydroxides of alkali metals, alkaline-earth metals, etc., alcoholate compounds, and carbonates are preferable with regard to catalyst processing and reaction efficiency, and hydroxides of alkali metals, alkaline-earth metals, etc., are more preferable.

The nonionic compound used in the emulsion composition according to the present invention must have a cloud point in a 1 percent aqueous solution that is less than or equal to 80 degrees Celsius. Here, the cloud point can be found easily by a measuring method such as the method described on page 95 of "New Introduction to Surface-Active Agents" by Takehiko FUJIMOTO (Sanyo Chemical Industries), etc. Specifically, the method for measuring the cloud point is to place a nonionic compound that has been diluted to a 1 percent by mass (percent by weight) percent aqueous solution into a test tube, insert a thermometer and a stirring rod, and raise the temperature slowly by gently stirring with the stirring rod. Because the transparent aqueous solution becomes cloudy when greater than or equal to a certain temperature, the cloud point is obtained by measuring the temperature when this clouding occurs.

Now, the form of addition of the added alkylene oxides may be modified to make the cloud point of the nonionic compound in a 1 percent aqueous solution less than or equal to 80 degrees Celsius, but the cloud point changes greatly depending on the form of addition such as random copolymer, block copolymer, etc., molecular weight, or the quantity of ethylene oxide among the total alkylene oxides. The quantity of ethylene oxide among the total alkylene oxides cannot be limited, but generally the ethylene oxide should be added to the total alkylene oxides so as to be preferably 10 to 90 percent by mass (percent by weight), and even more preferably 20 to 80 percent by mass (percent by weight). In addition, the cloud point must be less than or equal to 80 degrees Celsius, but the preferable range of the cloud point may differ depending on the intended use. For damping material paint use, for example, the cloud point should be preferably 10 to 80 degrees Celsius, more preferably 30 to 70 degrees Celsius, and even more preferably 40 to 70 degrees Celsius. In paints aimed at preventing dripping, 0 to 70 degrees Celsius is preferable, and 0 to 60 degrees Celsius is more preferable. For any intended use, it is undesirable for the cloud point of the nonionic compound to exceed 80 degrees Celsius since blistering, cracking, or dripping of the paint film cannot be suppressed effectively.

Examples of the synthetic resin used in the emulsion composition according to the present invention include urethane-base, acrylate-base, styrene-base synthetic resins, etc. Examples of methods for adding the synthetic resin to the emulsion composition according to the present invention include, for example: methods in which the nonionic compound is dispersed or dissolved in water, and then emulsified by adding the synthetic resin thereto; methods in which the nonionic compound is mixed with the synthetic resin and then emulsified by adding water, etc., but methods in which the synthetic resin is prepared as an emulsion and the nonionic compound is added to the synthetic resin emulsion are preferable. The synthetic resin emulsion can be obtained by a method such as emulsion polymerization, etc., in which various monomers, an emulsifier, and an initiator are added to water, for example.

Examples of synthetic resin emulsions include, for example: urethane-base emulsions; acrylate-base emulsions; styrene-base emulsions; vinyl acetate-base emulsions; SBR (styrene/butadiene) emulsion; ABS (acrylonitrile/butadiene/styrene) emulsion; BR (butadiene) emulsion; IR (isoprene) emulsion; NBR (acrylonitrile/butadiene) emulsion; or mixtures of these, etc.

Examples of urethane-base emulsions include, for example, polyether polyol-base, polyester polyol-base, and polycarbonate polyol-base emulsions, etc.

Examples of acrylate-base emulsions include, for example: (meta)acrylic acid (ester) monomer; and polymers such as (meta)acrylic acid (ester)/styrene, (meta)acrylic acid (ester)/vinyl acetate, (meta)acrylic acid (ester)/acrylonitrile, (meta)acrylic acid (ester)/butadiene, (meta)acrylic acid (ester)/vinylidene chloride, (meta)acrylic acid (ester)/allylamine, (meta)acrylic acid (ester)/vinylpyridine, (meta)acrylic acid (ester)/alkylolamide, (meta)acrylic acid (ester)/N,N-dimethylaminoethyl ester, (meta)acrylic acid (ester)/N,N-diethylaminoethyl vinyl ether, and cyclohexylmethacrylate-base, denatured epoxy-base, and denatured urethane-base polymers, etc.

Examples of styrene-base emulsions include, for example: styrene monomer; and polymers such as styrene/acrylonitrile, styrene/butadiene, styrene/fumarnitrile, styrene/maleinnitrile, styrene/cyanoacrylic acid ester, styrene/phenylvinyl acetate, styrene/chloromethylstyrene, styrene/dichlorostyrene, styrene/vinylcarbazole, styrene/N,N-diphenyl acrylamide, styrene/methylstyrene, acrylonitrile/butadiene/styrene, styrene/acrylonitrile/methylstyrene, styrene/acrylonitrile/vinylcarbazole, styrene/maleic acid, etc.

Examples of vinyl acetate-base emulsions include, for example: vinyl acetate monomer; and polymers such as vinyl acetate/styrene, vinyl acetate/vinyl chloride, vinyl acetate/acrylonitrile, vinyl acetate/maleic acid (ester), vinyl acetate/fumaric acid (ester), vinyl acetate/ethylene, vinyl acetate/propylene, vinyl acetate/isobutylene, vinyl acetate/vinylidene chloride, vinyl acetate/cyclopentadiene, vinyl acetate/crotonic acid, vinyl acetate/acrolein, vinyl acetate/alkyl vinyl ether, etc.

Among these synthetic resin emulsions, using urethane-base emulsions, acrylate-base emulsions, and styrene-base emulsions is preferable because effects preventing blistering, cracking, etc., are superior.

The nonionic compound used in the emulsion composition according to the present invention can be added in any quantity relative to the synthetic resin, but preferably 0.1 to 300 percent by mass (percent by weight) relative to the synthetic resin, more preferably 0.5 to 100 percent by mass (percent by weight), even more preferably 1 to 50 percent by mass (percent by weight), and most preferably 2 to 20 percent by mass (percent by weight). If less than 0.1 percent by mass (percent by weight), it may not be possible to suppress blistering, cracking, etc., of the paint film, and it is undesirable to exceed 300 percent by mass (percent by weight), since this may have adverse effects on physical properties of the paint film. Moreover, since effects proportionate to the added quantity may not be obtained if the added quantity of nonionic compound exceeds 100 percent by mass (percent by weight), when economic effects are considered, it is preferable for the added quantity to be less than or equal to 100 percent by mass (percent by weight).

Commonly-known additives such as, for example: pigments including white pigments such as titanium dioxide, calcium carbonate, barium carbonate, kaolin, and colored pigments such as carbon black, hematite, cyanine blue, etc.; water soluble resins such as polyvinyl alcohol, etc.; phenol-base, phosphorus-base, sulfur-base antioxidants, etc.; ultraviolet absorbers; film forming auxiliaries; waterproofing agents; preservatives; pesticides; solvents; plasticizers; dispersing agents; thickeners; antifoaming agents; deodorants; perfumes; extenders; and dyes, etc., can also be used in the emulsion composition according to the present invention as required.

With regard to actual uses, the emulsion composition according to the present invention can be used for, for example: adhesives; paints for external walls, interior decoration, roofs, floors, etc., of buildings; paints for exterior decoration and interior decoration of automobiles; and water-base damping material paints, etc., can preferably be used in elastic paints and water-base damping material paints for buildings that form thick paint films, and spray paint films for construction that form thin paint films, etc., and can be used more preferably as water-base damping material paints that dry by heating to form thick paint films, and spray paints for which there are dripping problems.

A water-base paint composition and a water-base damping material paint composition according to the present invention use the emulsion composition according to the present invention. Generally, they are manufactured by mixing together the synthetic resin emulsion and a mill base in which a pigment is dispersed, for example, and the white pigments and colored pigments, etc., described above can be used for the pigment. Furthermore, antioxidants, ultraviolet absorbers, waterproofing agents, preservatives, pesticides, solvents, plasticizers, dispersing agents, thickeners, antifoaming agents, deodorants, perfumes, extenders, dyes, etc., can also be used. Here, "damping material" means a sheet, for example, that is used for noise damping and soundproofing in automobiles, buildings, etc., and "damping material paint" means a paint that is applied thickly in a sheet form to achieve the desired properties.

These paint compositions do not give rise to cracking, blistering, or dripping, etc., even if dried forcefully at high temperatures, but exhibit similar effects even if left for a long time at normal temperatures. At an actual building-site, for example, a coating may be applied and then be left until the next day if working hours are over. Leaving paint after application in this manner may normally cause cracking, particularly when the air temperature is high such as in summer, etc., but one effect of the paint composition according to the present invention is to prevent cracking even under such conditions.

A paint film according to the present invention can be obtained by applying and drying an emulsion composition or a water-base paint composition or a water-base damping material paint composition according to the present invention. Examples of substrates for application include, for example: wood; paper; fiber; concrete; mortar; stone; ceramic; glass; plastics; metal, etc., and examples of application methods that can be used include commonly-known methods such as: spray coating; brush coating; roller coating; shower coating; dip coating, etc. Examples of drying methods include methods such as: air drying at normal temperatures, drying under reduced pressure, drying by heating, etc., but because problems such as blistering, cracking, dripping, etc., do not arise in the emulsion composition and the water-base damping material paint composition according to the present invention even if heated, drying by heating that can shorten drying time is preferable. When drying by heating, heating at a temperature greater than or equal to 50 degrees Celsius is preferable, 50 to 200 degrees Celsius is more preferable, and 50 degrees Celsius to 150 degrees Celsius is even more preferable. Furthermore, there is no limit to thickness of the paint film, but a coating thickness of 0.01 to 5 mm is preferable, 0.02 to 5 mm is more preferable, and 0.10 to 5 mm is even more preferable.

The effects of the present invention are to provide an emulsion composition that can form a paint film having no blistering or cracking even if the paint film is thick or drying temperatures are high, etc., and an emulsion composition that does not drip when applied to a vertical surface or an irregular surface, etc., even if dried at high temperatures, and a water-base paint composition that uses that emulsion composition.

EXAMPLES

The present invention will now be explained in further detail using inventive examples. Moreover, unless otherwise stated, "percent (%)" and "ppm" in the following inventive examples refer to mass (weight).

The test compounds that were used in these tests used aliphatic alcohols constituting a base to which various alkylene oxides were added. Compositions of these compounds are shown in Table 1. Moreover, in Table 1, EO represents ethylene oxide, PO propylene oxide, and BO butylene oxide. Furthermore, R for form of addition represents random bonding, and B block bonding, and following B is the order of addition of added alkylene oxides, EO-PO, for example, meaning that ethylene oxide was added to the aliphatic alcohol constituting the base and then propylene oxide was added. In addition, quantity of alkylene oxide represents the respective mass (weight) ratios of EO, PO, and BO in the alkylene oxide chain.

TABLE 1

| Test compound | Aliphatic alcohol | No. of functional groups | Quantity of alkylene oxide (mass %) | | | Form of addition | Molecular weight | 1% cloud point (° C.) |
|---|---|---|---|---|---|---|---|---|
| | | | EO | PO | BO | | | |
| 1 | butanol | 1 | 50 | 50 | | R | 2,000 | 52 |
| 2 | | | 50 | | 50 | R | 2,000 | 24 |
| 3 | propylene glycol | 2 | 50 | 50 | | R | 3,000 | 55 |
| 4 | | | 50 | | 50 | R | 3,000 | 15 |
| 5 | | | 70 | 30 | | R | 5,000 | 69 |
| 6 | | | 10 | 90 | | B/PO-EO | 2,000 | 40 |
| 7 | glycerin | 3 | 50 | 50 | | R | 2,500 | 62 |
| 8 | | | 70 | 30 | | R | 5,000 | 70 |
| 9 | | | 70 | | 30 | R | 700 | 62 |
| 10 | | | 20 | 80 | | B/EO-PO | 3,000 | 12 |
| 11 | trimethylolpropane | 4 | 20 | 80 | | B/PO-EO | 5,000 | 15 |
| 12 | pentaerythritol | 5 | 50 | 50 | | R | 2,500 | 55 |
| 13 | | | 50 | | 50 | R | 2,500 | 15 |
| 14 | sorbitol | 6 | 70 | 30 | | R | 5,000 | 56 |
| 15 | | | 70 | | 30 | R | 10,000 | 14 |
| 16 | lauryl alcohol | 1 | 100 | | | — | 700 | 62 |
| 17 | propylene glycol | 2 | 50 | 50 | | R | 600 | >100 |
| 18 | glycerin | 3 | 20 | 80 | | R | 400 | 40 |
| 19 | | | | 20 | 80 | R | 2,000 | insoluble |
| 20 | butyl cellosolve (ethylene glycol monobutyl ether) | | | | | | 118 | <0 |

In Table 1, it was not possible to produce a 1 percent aqueous solution for compound 19.

Paint Film Test 1

Following the combination described below, general industrial paints were prepared by mixing a general industrial paint mill base until uniform using a ball mill, then adding an acrylic-base emulsion having a minimum film forming temperature of 25 degrees Celsius and other additives, and mixing until uniform using a disperser. The prepared paints were applied to steel sheets to a thickness of 1 mm using an applicator, dried at a baking temperature of 70 degrees Celsius for 15 minutes, and then blistering and cracking after drying were determined visually (Table 2).

General industrial mill base recipe:

| General industrial mill base recipe: | |
|---|---|
| pigment dispersing agent | 0.5 part by mass (weight) |
| propylene glycol | 3.0 part by mass (weight) |
| silicon-base antifoaming agent | 0.3 part by mass (weight) |
| titanium oxide | 30 part by mass (weight) |
| water | 16 part by mass (weight) |
| Subtotal: | 49.8 part by mass (weight) |

| General industrial paint recipe: | |
|---|---|
| general industrial mill base | 49.8 part by mass (weight) |
| acrylic-base resin emulsion | 50.0 part by mass (weight) |
| silicon-base antifoaming agent | 0.3 part by mass (weight) |
| urethane-base thickener | 0.3 part by mass (weight) |
| test compound | 2.0 part by mass (weight) |
| Total: | 102.4 part by mass (weight) |
| Acrylic resin content in acrylic-base resin emulsion: | 50 percent by mass (weight) |

General evaluation was also determined by observing the degree of blistering and cracking. Criteria were as follows:

<Criteria>

A: No blistering or cracking. Not generally problematic at all;

B: Blistering and cracking present but sufficiently inconspicuous as to be unnoticeable without special attention. Not generally problematic;

C: Conspicuous blistering and cracking present in several places. May be generally problematic; and D: Conspicuous blistering and cracking present innumerably. Generally problematic and unfit for commercial product.

TABLE 2

| | | Test compound | Blistering | Cracking | Overall |
|---|---|---|---|---|---|
| Inventive examples | 1 | 1 | B | A | B |
| | 2 | 2 | B | B | B |
| | 3 | 3 | A | A | A |
| | 4 | 4 | A | B | B |
| | 5 | 5 | A | A | A |
| | 6 | 6 | A | A | A |
| | 7 | 7 | A | A | A |
| | 8 | 8 | A | A | A |
| | 9 | 9 | A | A | A |
| | 10 | 10 | B | B | B |
| | 11 | 11 | B | B | B |
| | 12 | 12 | A | A | A |
| | 13 | 13 | B | A | B |
| | 14 | 14 | A | A | A |
| | 15 | 15 | A | A | A |
| Comparative examples | 1 | 16 | D | C | D |
| | 2 | 17 | D | D | D |
| | 3 | 18 | C | D | D |
| | 4 | 19 | — | — | — |
| | 5 | 20 | D | D | D |
| | 6 | — | D | D | D |

In Table 2, Comparative Example 4 could not be evaluated since it would not dissolve in water and could not be made into a paint.

Paint Film Test 2

Following the combination described below, water-base damping material paint compositions were prepared by mixing a water-base damping material paint composition mill base until uniform using a ball mill, then adding an acrylic-base emulsion having a minimum film forming temperature of 50 degrees Celsius and other additives, and mixing until uniform using a disperser. The prepared paint compositions were applied to steel sheets to a thickness of 3 mm using an applicator, dried by one of two drying methods including: drying at 30 degrees Celsius for 24 hours; and drying at a baking temperature of 130 degrees Celsius for 20 minutes, and then blistering and cracking after drying were determined visually (Table 3). Moreover, examples dried at 30 degrees Celsius for 24 hours were evaluated only for cracking.

Water-base damping material paint composition mill base recipe:

| Water-base damping material paint compostion mill base recipe: | |
|---|---|
| pigment dispersing agent | 0.5 part by mass (weight) |
| propylene glycol | 3.0 part by mass (weight) |
| silicon-base antifoaming agent | 0.2 part by mass (weight) |
| calcium oxide | 45 part by mass (weight) |
| water | 10 part by mass (weight) |
| Subtotal: | 58.7 part by mass (weight) |

| Water-base damping material paint composition recipe: | |
|---|---|
| water-base damping material paint composition mill base | 58.7 part by mass (weight) |
| acrylic-base resin emulsion | 40.0 part by mass (weight) |
| silicon-base antifoaming agent | 0.2 part by mass (weight) |
| urethane-base thickener | 0.2 part by mass (weight) |
| test compound | 2.0 part by mass (weight) |
| Total: | 101.1 part by mass (weight) |
| Acrylic resin content in acrylic-base resin emulsion: | 50 percent by mass (weight) |

General evaluation was also determined by observing the degree of blistering and cracking. Criteria were as follows:

<Criteria>

A: No blistering or cracking. Not generally problematic at all;

B: Blistering and cracking present but sufficiently inconspicuous as to be unnoticeable without special attention. Not generally problematic;

C: Conspicuous blistering and cracking present in several places. May be generally problematic; and D: Conspicuous blistering and cracking present innumerably. Generally problematic and unfit for commercial product.

TABLE 3

| | | Test compound | Drying at 30° C. for 24 hr Cracking | Drying at 130° C. for 20 min | | |
|---|---|---|---|---|---|---|
| | | | | Blistering | Cracking | Overall |
| Inventive examples | 16 | 1 | B | B | A | B |
| | 17 | 2 | B | A | B | B |
| | 18 | 3 | A | A | A | A |
| | 19 | 4 | A | B | A | B |
| | 20 | 5 | A | A | A | A |
| | 21 | 6 | B | A | A | A |
| | 22 | 7 | A | A | A | A |
| | 23 | 8 | B | A | A | A |
| | 24 | 9 | A | A | A | A |
| | 25 | 10 | A | B | B | B |
| | 26 | 11 | B | B | B | B |
| | 27 | 12 | A | A | A | A |
| | 28 | 13 | A | B | A | B |
| | 29 | 14 | B | A | A | A |
| | 30 | 15 | A | A | A | A |
| Comparative examples | 7 | 16 | D | C | D | D |
| | 8 | 17 | D | D | D | D |
| | 9 | 18 | C | C | D | D |
| | 10 | 19 | — | — | — | — |
| | 11 | 20 | D | D | D | D |
| | 12 | — | D | D | D | D |

In Table 3, Comparative Example 10 could not be evaluated since it would not dissolve in water and could not be made into a paint.

Paint Film Test 3

Following the combination described below, general industrial spray paints were prepared by mixing a general industrial paint mill base until uniform using a ball mill, then adding an acrylic-base emulsion having a minimum film forming temperature of 25 degrees Celsius and other additives, and mixing until uniform using a disperser. The prepared spray paints were sprayed onto steel sheets standing vertically to a thickness of 25 µm using a spray, then dried at 110 degrees Celsius for 20 minutes, and dripping during drying was determined visually (Table 4).

| General industrial mill base recipe: | |
|---|---|
| pigment dispersing agent | 0.5 part by mass (weight) |
| propylene glycol | 3.0 part by mass (weight) |
| silicon-base antifoaming agent | 0.3 part by mass (weight) |
| titanium oxide | 30 part by mass (weight) |
| water | 16 part by mass (weight) |
| Subtotal: | 49.8 part by mass (weight) |
| General industrial spray paint recipe: | |
| general industrial mill base | 49.8 part by mass (weight) |
| acrylic-base resin emulsion | 40.0 part by mass (weight) |
| silicon-base antifoaming agent | 0.2 part by mass (weight) |
| urethane-base thickener | 0.2 part by mass (weight) |
| test compound | 2.0 part by mass (weight) |
| Total: | 92.2 part by mass (weight) |
| Acrylic resin content in acrylic-base resin emulsion: | 50 percent by mass (weight) |
| Added quantity of high-viscosity xanthan gum constituting the test compound of Comparative Example 18: | 0.5 part by mass (weight) |

Criteria for dripping were as follows:
<Criteria>
A: No dripping observed at all;
B: Dripping present but sufficiently unnoticeable without special attention and not problematic for commercial product;
C: Conspicuous dripping present in several places, may be problematic for commercial product; and
D: Frequent dripping present, unfit for commercial product.

TABLE 4

| | | Test compound | Dripping |
|---|---|---|---|
| Inventive examples | 31 | 1 | B |
| | 32 | 2 | B |
| | 33 | 3 | A |
| | 34 | 4 | A |
| | 35 | 5 | A |
| | 36 | 6 | B |
| | 37 | 7 | A |
| | 38 | 8 | A |
| | 39 | 9 | A |
| | 40 | 10 | B |
| | 41 | 11 | B |
| | 42 | 12 | A |
| | 43 | 13 | A |
| | 44 | 14 | A |
| | 45 | 15 | A |
| Comparative examples | 13 | 16 | D |
| | 14 | 17 | D |
| | 15 | 18 | D |
| | 16 | 19 | D |
| | 17 | 20 | D |
| | 18 | high-viscosity xanthan gum | D |
| | 19 | — | D |

What is claimed is:

1. An emulsion composition comprising:
    a nonionic compound having a molecular weight that is greater than or equal to 500 and a cloud point that is less than or equal to 80 degrees Celsius in a 1 percent aqueous solution in which ethylene oxide and an alkylene oxide having a carbon number that is greater than or equal to 3 are added in block and/or random form to an aliphatic alcohol having a carbon number that is less than or equal to 18 and a hydricity that is 2 to 6; and
    a synthetic resin emulsion selected from the group consisting of urethane-base emulsions, acrylate-base emulsions, styrene-base emulsions, vinyl acetate-base emulsions, SBR (styrene/butadiene) emulsion, ABS (acrylonitrile/butadiene/styrene) emulsion, BR (butadiene) emulsion, IR (isoprene) emulsion, NBR (acrylonitrile/butadiene) emulsion and mixtures thereof.

2. The emulsion composition according to claim 1, wherein:
    said aliphatic alcohol has a carbon number that is 3 to 6.

3. The emulsion composition according to claim 1, wherein:
    said ethylene oxide and said alkylene oxide having a carbon number that is greater than or equal to 3 are added in random form.

4. A water-base paint composition using the emulsion composition according to claim 1.

5. A paint-type water-base damping material paint composition using the emulsion composition according to claim 1.

6. A paint film obtained by applying and drying the emulsion composition according to claim 1.

7. The paint film according to claim 6 obtained by drying by applying a temperature greater than or equal to 50 degrees Celsius.

8. The paint film according to claim 6, wherein:
    said paint film has a thickness of 0.01 to 5.00 mm.

9. The emulsion composition according to claim 2, wherein:

said ethylene oxide and said alkylene oxide having a carbon number that is greater than or equal to 3 are added in random form.

10. A water-base paint composition using the emulsion composition according to claim 2.

11. A water-base paint composition using the emulsion composition according to claim 3.

12. A water-base paint composition using the emulsion composition according to claim 2.

13. A water-base paint composition using the emulsion composition according to claim 3.

14. A paint film obtained by applying and drying the paint composition according to claim 4.

15. A paint film obtained by applying and drying the paint composition according to claim 5.

* * * * *